June 30, 1925.
C. H. SEARS
1,544,275
SHEAVE OR PULLEY
Filed May 16, 1924
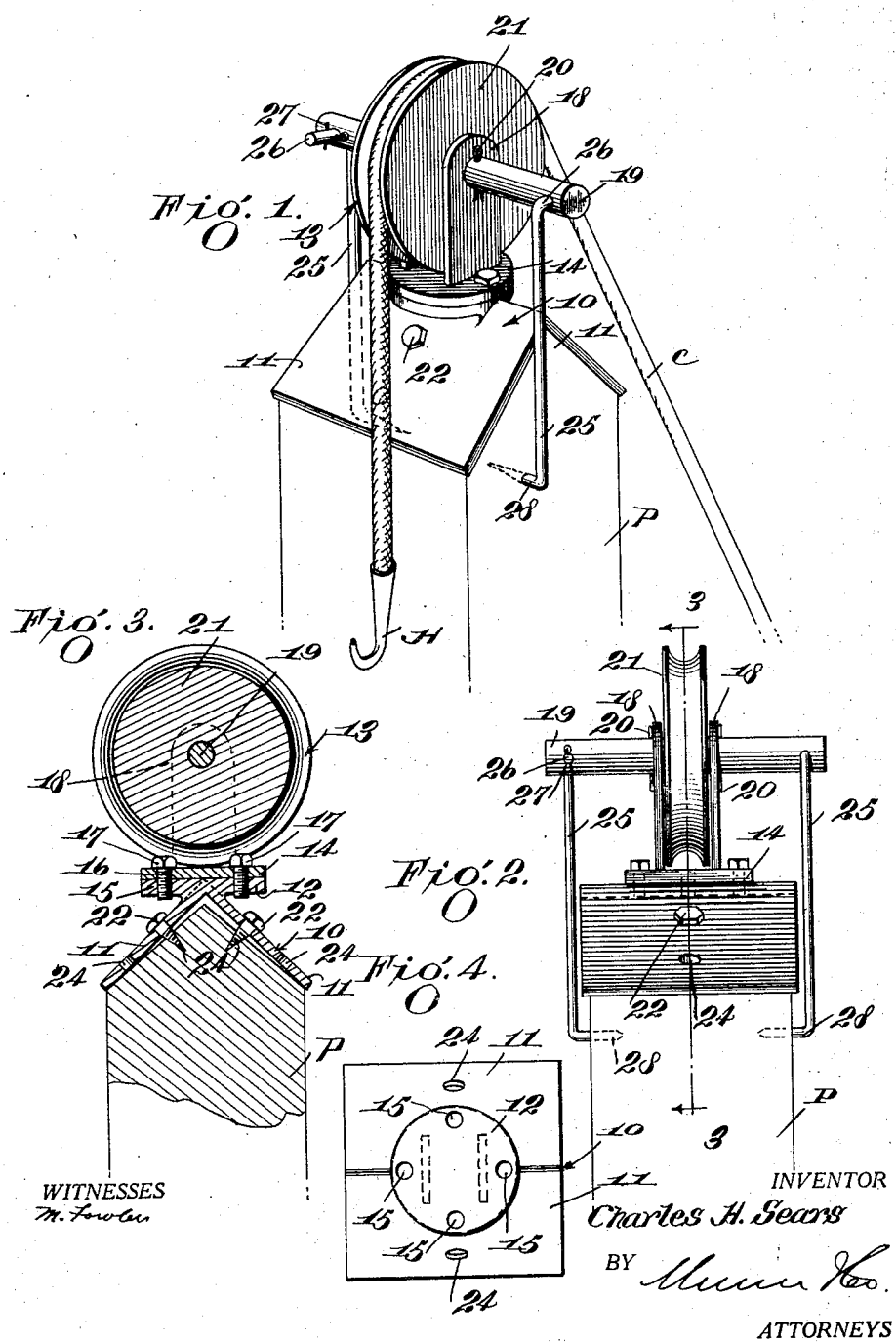
WITNESSES
INVENTOR
Charles H. Sears
BY
ATTORNEYS Patented June 30, 1925.

1,544,275

UNITED STATES PATENT OFFICE.

CHARLES H. SEARS, OF CENTRALIA, WASHINGTON.

SHEAVE OR PULLEY.

Application filed May 16, 1924. Serial No. 713,302.

*To all whom it may concern:*

Be it known that I, CHARLES H. SEARS, a citizen of the United States, residing at Centralia, in the county of Lewis, State of Washington, have invented certain new and useful Improvements in Sheaves or Pulleys, of which the following is a specification.

This invention relates to an improved sheave or pulley, especially designed for use on the tops of poles, such as electric light poles, or the like.

The object of the invention is to provide a sheave or pulley of this character which may be readily carried from place to place and readily and easily applied although adapted to be securely and strongly mounted when applied and which when positioned on the top of the pole greatly facilitates the raising of heavy objects such as cables, transformers, or the like from any side of the pole.

Other objects and advantages of the invention reside in certain novel features of construction, combination and arrangement of parts which will be hereinafter more fully described and particularly pointed out in the appended claims, reference being had to the accompanying drawings forming part of this specification, and in which:—

Figure 1 is a perspective view showing one embodiment of the invention,

Figure 2 is a view thereof in end elevation,

Figure 3 is a view in vertical section taken on the line 3—3 of Figure 2, and

Figure 4 is a view in top plan of the attaching bracket and supporting plate.

Referring to the drawings it will be seen that the invention in this embodiment comprises an attaching bracket designated generally at 10 and including diverging wings 11. A circular supporting plate 12 is integrally formed with or suitably connected to the upper portion of the attaching bracket 10.

A pulley or sheave assembly designated generally at 13 is provided and includes a circular base plate 14 designed to be fitted on and secured to the supporting plate 12 in the desired angular adjustment. In order to effect this latter purpose, the supporting plate 12 is formed with a circular series of threaded openings 15, four openings 15 spaced at angular intervals of 90° being shown in this embodiment. The base plate 14 is provided with a pair of diametrically opposite openings 16 adapted to be selectively registered with opposed openings of the series 15. Screws 17 are engaged with the registered openings 15 and 16 to hold the plates 12 and 14 in the desired adjustment. The heads of the screws 17 are of polygonal form so that they may be readily applied and removed. Standards 18 have their lower ends secured to the base plate 14 and these standards upstand vertically from the base in spaced parallel relation. A shaft 19 is mounted in bearings provided therefor in the standards 18 and may be held against endwise movement by cotter pins 20. On the shaft 19 between the standards 18 a pulley or sheave 21 is rotatably mounted in any approved manner.

The arrangement just described may be readily placed on the tapered top of an electric light pole P as shown in Figures 1 to 3 and may be secured in such position by driven or threaded fastening devices 22 extending through openings 24 provided in the wing 11 and engage the top of the pole P. A plurality of openings 24 are provided in each wing 11 so that the attaching bracket 10 may be securely fastened to the pole P even though the inclined faces of the tapered upper end of the poles may be of various inclinations. In addition to this supporting and securing action a pair of dogs 25 are provided. The members of the pair of dogs 25 are on the opposite sides of the shaft 19 and adjacent the opposite ends thereof as shown to advantage in Figure 1. The upper end of each dog 25 is bent at right angles to the major portion of the dog and to provide a pivot member 26 which is pivotally mounted in a transverse bearing opening provided therefor in the shaft 19. Cotter pins 27 are provided to hold the pivot members against endwise displacement. At their lower ends the dogs 25 are provided with inwardly offset pointed prongs 28 adapted to be driven into the pole. Obviously, the dogs 25 rigidly and securely brace the pulley assembly and enhance the capacity and strength of the same.

It is to be understood that a cable C is engaged with the upper portion of the grooved periphery of the pulley 21 and carries a hook H at the one end, the other end of the cable being controlled in any suitable way.

I claim:

1. In a device of the character described, an attaching bracket adapted to be secured on the top of a pole or the like, a pulley assembly mounted on the attaching bracket, said pulley assembly including a shaft, and a pair of dogs pivoted to the shaft and having prongs adapted to be driven into the pole to aid in securing the device in position.

2. In a device of the character described, an attaching bracket adapted to be secured on the top of a pole or the like, a pulley assembly mounted on the attaching bracket and including a shaft having transverse openings adjacent its ends, a pair of dogs, each dog having an end portion extended at an angle to the major portion thereof, said end portions being rotatably fitted in the openings of the shafts whereby the dogs are pivotally mounted for movement in a plane parallel to the plane of the shaft, said dogs having inwardly offset portions adapted to be driven into the pole or the like to aid in securing the device in position.

CHARLES H. SEARS.